(12) United States Patent
Korevaar

(10) Patent No.: US 6,490,066 B1
(45) Date of Patent: Dec. 3, 2002

(54) LASER/MICROWAVE DUAL MODE COMMUNICATIONS SYSTEM

(75) Inventor: Eric Korevaar, La Jolla, CA (US)

(73) Assignee: Astroterra Corporation, San Diego, CA (US)

( * ) Notice: Subject to any disclaimer, the term of this patent is extended or adjusted under 35 U.S.C. 154(b) by 0 days.

(21) Appl. No.: 09/364,001

(22) Filed: Jul. 29, 1999

(51) Int. Cl.[7] .............................................. H04B 10/00
(52) U.S. Cl. ...................................... 359/152; 359/159
(58) Field of Search ............................... 359/152, 110, 359/159, 172, 154

(56) References Cited

U.S. PATENT DOCUMENTS

| | | | | |
|---|---|---|---|---|
| 4,305,555 A | * | 12/1981 | Davis | 244/158 R |
| 5,229,593 A | | 7/1993 | Cato | |
| 5,777,768 A | | 7/1998 | Korevaar | |
| 5,880,868 A | * | 3/1999 | Mahany | 359/152 |

FOREIGN PATENT DOCUMENTS

WO          35551 A1  *  5/2001

OTHER PUBLICATIONS

W.M. Bruno, R. Mangual, and R.F. Zampolin, *Diode Laser Spatial Diversity Transmitter*, pp. 187–194, SPIE vol. 1044 Optomechanical Design of Laser Transmitters and Receivers, (1989).
E. Korevaar et al., *Status of SDIO/IS&T Lasercom Testbed Program*, pp. 116–127, SPIE vol. 1866, Jan. 1993.
E. Korevaar et al., *Status of BMDO/IST Lasercom Advanced Technology Demonstration*, pp. 96–107, SPIE vol. 2123, Jan. 1994.
E. Korevaar et al., *Design of Satellite Terminal for BMDO Lasercom Technology Demonstration*, pp. 60–71, SPIE vol. 2381, Feb., 1995.
J. Schuster et al., *Optomechanical Design of STRV–2 Lasercom Transceiver Using Novel Azimuth/Slant Gimbal*, pp. 227–239, SPIE vol. 2699, Jan. 1996.
K.E. Wilson et al., *Preliminary Results of the Ground/Orbiter Lasercomm Demonstration Experiment between Table Mountain and the ETS–VI Satellite*, pp. 121–132, SPIE vol. 2699, May 1996.
Terralink™ Laser Communications Systems Brochure, including Terralink–155™ Transceiver Specifications. Brochure produced by AstroTerra Corporation.

* cited by examiner

Primary Examiner—Thomas Mullen
(74) Attorney, Agent, or Firm—Nydegger & Associates

(57) ABSTRACT

A dual mode laser/microwave transceiver for use in line-of-sight communications includes a housing that is formed with a single aperture for receiving both a laser beam and a microwave beam. A turning mirror and a beam splitter are mounted within the housing, and the turning mirror reflects an incoming laser/microwave beam onto the beam splitter which separates the laser beam from the microwave beam. The microwave beam is then directed by the beam splitter toward a microwave feed that is mounted on the housing. On the other hand, the laser beam is directed by the beam splitter toward an optical receiver that is mounted on the housing. Transmitted laser and microwave beams are respectively sent through the transceiver in directions opposite to that of the received beams.

19 Claims, 3 Drawing Sheets

LASER/MICROWAVE DUAL MODE COMMUNICATIONS SYSTEM

FIELD OF THE INVENTION

The present invention pertains generally to communications systems. More particularly, the present invention pertains to wireless communications links between line-of-sight stations in a communications system. The present invention is particularly, but not exclusively, useful as a communications link that can alternate between a laser mode and a microwave mode of operation in order to maintain effective communications in a wide variety of atmospheric conditions.

BACKGROUND OF THE INVENTION

Wireless communications systems per se are well known in the prior art and have been used for communications links for the transmission of data, video and audio signals. Wireless systems offer the general advantage that they include links which do not require the laying of cables between the stations and, therefore, are more flexible in their installation and reconfiguration. One type of wireless system that is finding many new applications is a system which carries its communications signals on light beams.

Laser data links between line-of-sight stations are capable of handling high data transmission rates, which are in the range of several Gigabits per second (Gb/s). Laser data links, however, can be adversely affected by certain types of atmospheric conditions. For instance, it can be shown that haze, fog or heavy snow conditions will cause severe attenuation of the laser beam. This attenuation is due to scattering and when it happens, the laser data link becomes unreliable. Thus, even if adverse weather conditions are infrequent, an additional backup system may be necessary or desirable.

Microwave communications systems, like laser systems, are also well known as a means for establishing a wireless data link. Microwave data links, however, also have certain shortcomings. These shortcomings, however, are different than those associated with laser links. Specifically, microwave data links generally have a slower data transmission rate than laser systems. Typically, rather than transmitting data at rates of Gigabits per second (Gb/s), the data transmission rate for a microwave data link is less than a few hundred Megabits per second (Mb/s). Further, certain atmospheric conditions also adversely affect a transmitted microwave.

It happens that the atmospheric conditions which adversely affect microwave transmissions are different from the atmospheric conditions which adversely affect laser transmissions. Heavy rain, for instance, may not greatly affect a laser beam but it can cause significant attenuation of a microwave beam. On the other hand, it happens that a microwave beam is relatively unaffected by the same conditions mentioned above that will severely attenuate a laser beam, such as haze, fog and heavy snow. In sum, microwave data links can be reliably used to transfer data during periods when atmospheric conditions make a laser data link unreliable, and vice versa.

In light of the above, it is an object of the present invention to provide a hybrid wireless communications system that uses a single receiver for receiving either a laser beam or a microwave communications beam. It is another object of the present invention to provide a dual laser/microwave mode communications system that is available for effective data transfer between line-of-sight stations in a variety of atmospheric conditions. Another object of the present invention is to provide a dual laser/microwave mode communications system that is compact and space efficient. A further object of the present invention is to provide a dual laser/microwave mode communications system that is effectively easy to use, relatively simple to manufacture and comparatively cost effective.

SUMMARY OF THE PREFERRED EMBODIMENTS

A transceiver for a dual mode laser/microwave communications system in accordance with the present invention includes a housing which is formed with a single aperture for establishing communications along a common beam path inside the housing. As intended for the present invention, communications signals can be carried on either a microwave beam or a laser beam. In either case, the beam will be directed along the common beam path inside the housing from the aperture to a receiver (an incoming beam), or from an appropriate transmitter toward the aperture (outgoing beam).

Mounted within the housing of the system of the present invention are: an optical transceiver for receiving and transmitting communications on a laser beam; a microwave feed for receiving and transmitting communications on a microwave beam; a dielectric mirror (e.g. a beam splitter) for connecting either the optical transceiver or the microwave feed with a common beam path; and, a turning mirror for directing communications along the common beam path between the housing aperture and the dielectric mirror (beam splitter). In the preferred embodiment of the present invention, the dielectric mirror (beam splitter) is made of a material that will reflect a laser beam but which will allow the passage of a microwave beam through the mirror (beam splitter). Alternatively, the dielectric mirror will reflect a microwave beam and allow the passage of a laser beam. The turning mirror may be spherical or parabolic (or any other desired shape) and is preferably made of a metalized material which will reflect both a laser beam and a microwave beam.

For a preferred embodiment of the present invention, the turning mirror is formed with an opening at its center, and its reflective surface is oriented to establish the common beam path between the housing aperture and the dielectric mirror (beam splitter). The dielectric mirror (beam splitter) is then oriented to reflect either the laser beam or the microwave beam between the reflective surface of the turning mirror and the opening in the turning mirror. For this configuration, wherein the turning mirror has a central opening, a plurality of lenses and the optical transceiver can be positioned in the opening of the turning mirror for transmitting or receiving communications signals that are carried on a laser beam. It is, or course, also possible to mount separate laser transmitters on the outside of the housing. In this case, the optical transceiver will function only as a receiver. If microwave beams are directed toward the opening in the turning mirror, a microwave feed can be positioned in the opening of the turning mirror.

In an alternate embodiment, there is no need for the turning mirror to be formed with an opening at its center. Specifically, if the optical transceiver has a low profile configuration, such as is the case with a transceiver which incorporates an optical fiber, the optical transceiver (fiber) can actually be positioned between the turning mirror and the dielectric mirror (beam splitter). For either embodiment (i.e. the turning mirror with or without the central opening) the cooperation and combination of components for the system of the present invention is able to receive and to transmit communications signals on a laser beam.

Due to the use of a dielectric mirror (beam splitter) in the system of the present invention, a separate operation for receiving and transmitting communication signals that are carried on a microwave beam is also possible. Specifically, if the communications signal is carried on a microwave beam, the microwave beam will reflect from the turning mirror and then be reflected or passed by the dielectric mirror (beam splitter). This, of course, will depend on whether the dielectric mirror passes or reflects a laser beam and, in either case, it will do the opposite for the microwave beam. Thus, a microwave feed can be positioned within the housing behind the dielectric mirror for the reception and transmission of microwave beams. Preferably, the microwave feed is conically shaped and is sized for optimum reception or transmission of microwave beams in the range of thirty to fifty Gigahertz (30 GHz<f<50 GHz).

For the operation of the dual mode laser/microwave system of the present invention in the laser mode, the optical transceiver at one station transmits a laser beam along a line-of-sight path. This laser beam is then received as an incoming laser beam by the optical transceiver at another station. At the receiving station this incoming laser beam is received through the aperture of the housing and is reflected by the turning mirror toward the dielectric mirror (beam splitter). The dielectric mirror (beam splitter) then reflects the laser beam towards the receiving optical transceiver. Depending on the particular embodiment of the system that is being used, the receiving optical transceiver may be located in an opening in the center of the turning mirror, or at some other location.

For the operation of the dual laser/microwave mode communications system of the present invention in the microwave mode, the microwave feed of the transceiver at the sending station transmits a microwave beam. This transmitted microwave beam passes freely through the dielectric mirror (beam splitter) and is reflected from the turning mirror toward, and through, the aperture of the housing at the sending station. This transmitted microwave beam is then received as an incoming microwave beam at the receiving station. At the receiving station, the incoming microwave beam is received through the housing aperture and is reflected from the turning mirror toward the dielectric mirror (beam splitter). Unlike a laser beam, however, the microwave beam passes through the dielectric mirror (beam splitter) and is received by the microwave feed. In this manner, the communications system of the present invention establishes a dual laser/microwave mode communications link between line-of-sight stations using a single aperture and a common beam path, for increased reliability over a single laser mode or microwave mode system, and increased data rate over a single microwave mode system. As indicated above, depending on the capabilities of the beam splitter, the respective positions of the laser beam optics and the microwave feed may be reversed.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENT

Figure 1:
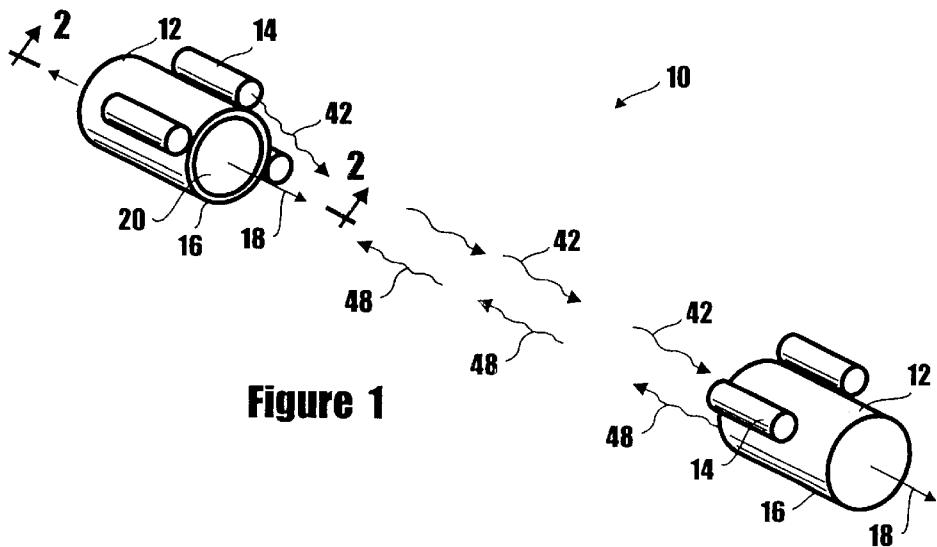
FIG. 1 is a perspective view of two dual laser/microwave mode communications transceivers of the present invention positioned relative to each other for establishing a line-of-sight communications link.

Referring initially to FIG. 1, a dual laser/microwave mode communications system in accordance with the present invention is shown and generally designated 10. As shown, the system 10 includes at least two transceivers 12 which can be positioned to have a line-of-sight relationship with each other for the purpose of establishing a communications link. All of the transceivers 12 in the system 10 have essentially the same structure.

As shown in FIG. 1, each transceiver 12 can have a plurality of laser transmitters 14 that are mounted on a housing 16. As also shown, each housing 16 is generally cylindrical in shape and defines a longitudinal axis 18. It is an important aspect of the system 10 that the housing 16 is formed with a single aperture 20 which is substantially centered on the longitudinal axis 18 of the housing 16. As disclosed in more detail below, this single aperture 20 allows for receiving communication data that is carried on either a laser beam or a microwave beam.

Figure 2A:
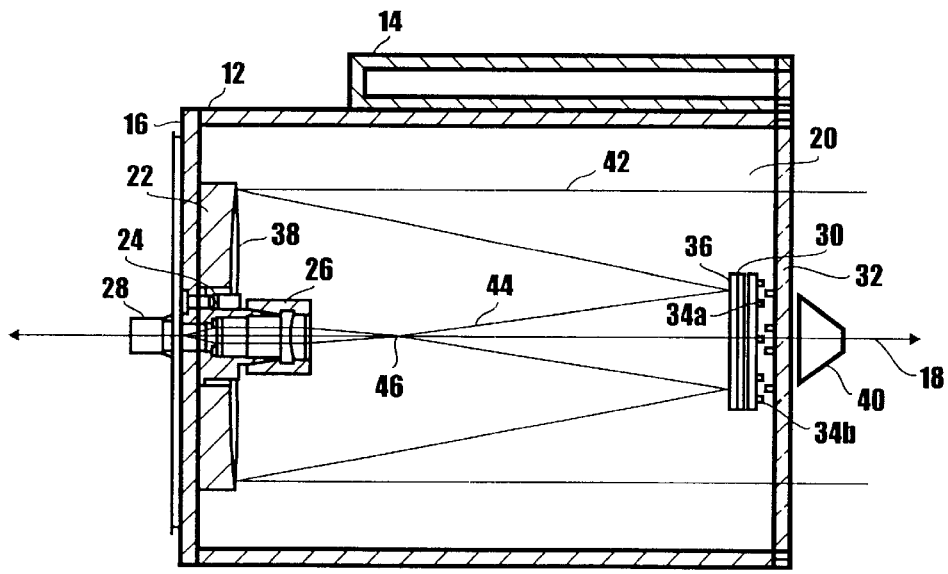
FIG. 2A is a cross-sectional view of the dual laser/microwave mode transceiver as seen along the line 2—2 in FIG. 1 illustrating the operation of the transceiver in its laser mode.

In FIG. 2A, it is seen that the transceiver 12 includes a turning mirror 22 which is mounted on the housing 16 and is oriented with its reflecting surface in a plane that is substantially perpendicular to the longitudinal axis 18. It will be appreciated by the skilled artisan that the reflecting surface of the turning mirror 22 will be curved, in order to change the size of the laser and microwave beams. For one embodiment of the present invention, the turning mirror 22 is formed with an opening 24 that is centered on the longitudinal axis 18 of the transceiver 12. For this embodiment of the turning mirror 22, a directional optics element 26 is positioned in this opening 24. Further, an optical receiver 28 is mounted on the housing 16 and is substantially centered on the longitudinal axis 18 behind the turning mirror 22 for receiving focused laser radiation from the optics element 26. The structure of an exemplary directional optics element 26 is described in greater detail in U.S. Pat. No. 6,118,131, entitled "Directional Optics For A System For Directing A Laser Beam Toward An Active Area" by Eric J. Korevaar, which is assigned to the same assignee as the present invention and which is incorporated herein by reference.

Still referring to FIG. 2A, it will be seen that the transceiver 12 includes a dielectric mirror 30 and a front cover 32 which is preferably made of a material that is transparent to both a laser beam and a microwave beam. Further, the front cover 32 is attached to the housing 16 opposite from the turning mirror 22 and covers the transceiver aperture 20. As shown, the dielectric mirror 30 can be mounted on the front cover 32 with a pair of brackets 34a, 34b and, importantly, the dielectric mirror 30 is oriented so that it is substantially perpendicular to, and centered on, the longitudinal axis 18 of the transceiver 12. In this orientation, the reflective surface 36 of the dielectric mirror 30 faces the reflective surface 38 of the turning mirror 22. Importantly, the dielectric mirror 30 is made either of a material that allows for the passage of microwave radiation through the mirror 30, but which reflects laser beam radiation, or it is made of a material that allows for the passage of a laser beam and reflects microwave radiation. For the version of the dielectric mirror (beam splitter) 30 which passes microwave radiation, a microwave feed 40 (which is attached to the front cover 32) can be positioned behind the dielectric mirror 30 with the dielectric mirror 30 between the feed 40 and the turning mirror 22. With this configuration, microwave beams that are reflected from the turning mirror 22 can pass through the dielectric mirror 30 for reception by the feed 40. For this purpose, the feed 40 needs to be substantially centered on the longitudinal axis 18 of the transceiver 12 and, in the preferred embodiment, the feed 40 is conically shaped and is sized for optimum reception and transmission of microwave radiation of frequency, f, in the range of thirty to fifty Gigahertz (30 GHz<f<50 GHz).

Figure 2B:
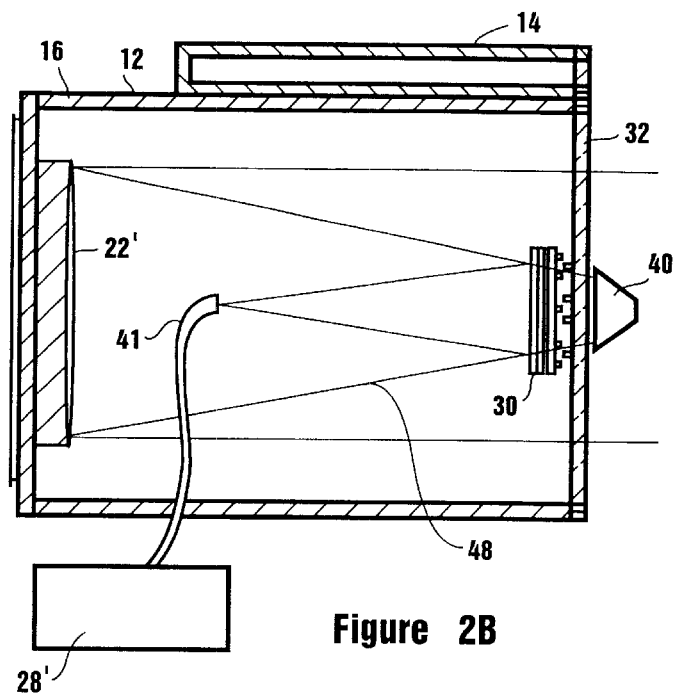
FIG. 2B is a cross-sectional view of an alternate embodiment of the dual laser/microwave mode transceiver as would be seen along the line 2—2 in FIG. 1 illustrating the operation of the transceiver in its laser mode.

For an alternate embodiment of the present invention, a turning mirror 22' can be used in place of the turning mirror 22 which has the opening 24. As shown in FIG. 2B, the turning mirror 22' is made without the opening 24. Thus, the location of the directional optics element 26 and the optical receiver 28 must be moved. This is possible by replacing the directional optics element 26 with an optical fiber 41. Specifically, because the optical fiber 41 has a reduced profile, its effect on light inside the housing 16 will be negligible. Thus, the optical fiber 41 can be positioned in front of the turning mirror 22' substantially as shown, and connected directly with an optical receiver 28' which is of a type that is compatible with the fiber 41.

Operation

As indicated above, the system 10 of the present invention is capable of operation in either a laser mode or a microwave mode. For use of the system 10 in the laser mode, a laser beam 42 is generated and sent by one of the laser transmitters 14 from a sending transceiver 12 for reception by a receiving transceiver 12 (see FIG. 1). This transmitted laser beam 42 is then received as an incoming laser beam 42 through the front cover 32 and aperture 20 of the receiving transceiver 12. The incoming laser beam 42 then reflects off the surface 38 of the spherical mirror 22 and is directed along a common beam path toward the dielectric mirror (beam splitter) 30 where it is then further reflected by the dielectric mirror 30 back toward the opening 24 in turning mirror 22. More specifically, as the laser beam 42 is reflected from the dielectric mirror (beam splitter) 30, it is focused to a focal point 46 that is located on the longitudinal axis 18. The laser beam 42 is then received by the directional optics element 26 and the optical receiver 28 in the opening 24 of the spherical mirror 22. For the alternate embodiment shown in FIG. 2B, as the laser beam 42 is reflected from the dielectric mirror (beam splitter) 30, it is focused to a focal point 46 that is located on the optical fiber 41. In either way, the system 10 of the present invention establishes a laser communications link between two transceivers 12 having a line-of-sight relationship with each other.

Figure 2C:
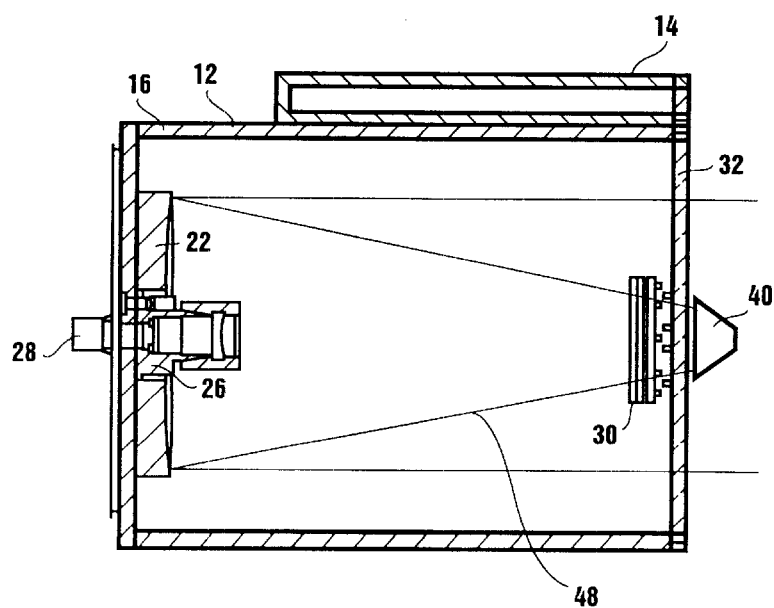
FIG. 2C is a cross-sectional view of the dual laser/microwave mode transceiver as shown in FIG. 2A illustrating the operation of the transceiver in its microwave mode.

For the operation of the system 10 in the microwave mode reference is made to FIG. 2C. With reference to FIG. 2C it is to be appreciated that a microwave beam 48 can be generated by a sending transceiver 12 for reception by a receiving transceiver 12. To do this, the microwave feed 40 at the sending transceiver 12 transmits the microwave beam 48. The transmitted microwave beam 48 then passes through the dielectric mirror (beam splitter) 30, and is reflected from the turning mirror 22. The microwave beam 48 then passes through the aperture 20 and is received as an incoming microwave beam 48 through the aperture 20 of the receiving transceiver 12. At the receiving transceiver 12, the incident microwave beam 48 is reflected from the surface 38 of the turning mirror 22 and is directed towards the dielectric mirror (beam splitter) 30. After passing through the dielectric mirror (beam splitter) 30, the microwave beam 48 is received by the microwave feed 40. In this manner, the dual laser/microwave communications system 10 of the present invention establishes a microwave line-of-sight communications link.

Due to faster data transmission, the system 10 is preferably operated in laser mode. As indicated above, however, this may not be possible during periods of haze, fog or heavy snow when a transmitted laser beam 42 can become severely attenuated, and therefore rendered ineffective. However, for these same atmospheric conditions, a microwave beam 48 is not so attenuated. Thus, the microwave mode of operation for the system 10 may be more effective. Once the haze, heavy snow or fog dissipates, the system 10 can be shifted from the microwave mode back to the faster laser mode of operation. Therefore, in order to ensure availability of the system 10 in all atmospheric conditions, it is necessary that the system 10 be selectively shifted between its laser mode and its microwave mode.

It is to be appreciated that the above disclosure has been primarily concerned with a configuration for the system 10 wherein the dielectric mirror (beam splitter) 30 reflects laser beams and passes microwave radiation. When a dielectric mirror (beam splitter) 30 passes laser beams and reflects microwave radiation, the locations of the microwave feed 40 and the optical receiver 28 will need to be reversed. In either case, the basic considerations herein disclosed will apply.

Figure 3:
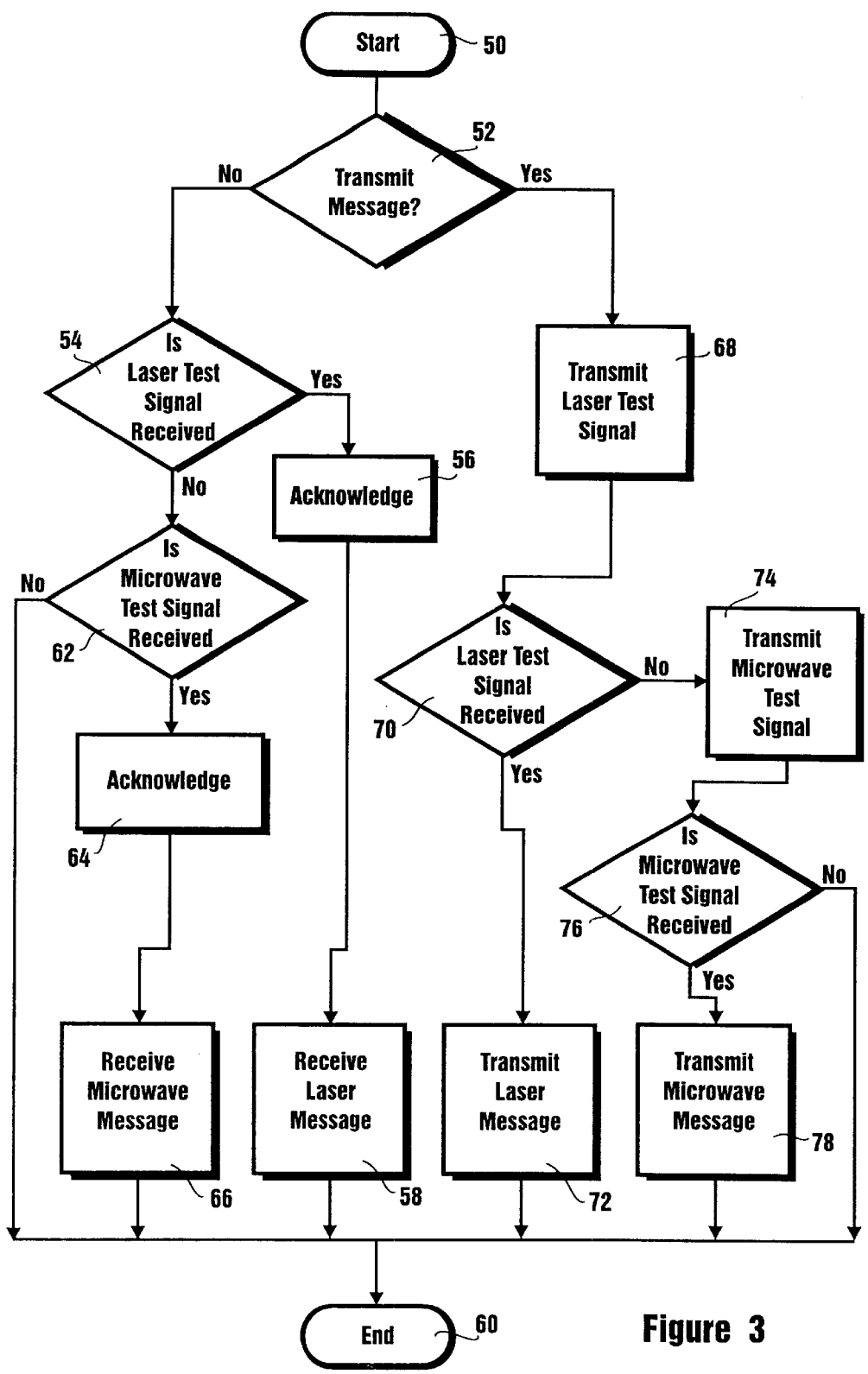
FIG. 3 is a block diagram showing an algorithm for selectively shifting the dual laser/microwave mode between the laser mode and the microwave mode.

FIG. 3 is a block diagram that illustrates an algorithm for implementing a shift between the laser mode to the microwave mode of operation. To begin, block 50 in FIG. 3 is the start of this algorithm. As shown by block 52, the first step in the algorithm involves determining whether the transceiver 12 of the system 10 is to transmit a communications message. If the transceiver 12 is not transmitting, block 54 indicates it is necessary to check for the receipt of a laser test signal. If the transceiver 12 receives the laser test signal, the transceiver 12 acknowledges the laser test signal, as shown by box 56. After acknowledging the laser test signal, the transceiver 12 is set to receive the communications message in laser mode (shown by box 58). After receipt of the message, or after a predetermined time interval, the end (box 60) of the algorithm is reached.

If the receiving transceiver 12 does not receive a laser test signal, as indicated at block 54, the transceiver 12 proceeds to check for a microwave test signal, as shown by box 62. If the microwave test signal is received, the receiving transceiver 12 then acknowledges receipt of the microwave test signal and receives the message in microwave mode, as shown by respective boxes 64 and 66. After receipt of the message, or after a predetermined time interval, the end (box 60) is reached. On the other hand, if the microwave test signal is not received, then neither the laser mode nor the microwave mode is available for operation of the system 10, and the end of the algorithm is reached, as shown by box 60.

Returning to block 52 in FIG. 3, if the transceiver 12 is to transmit a message over the communications link, the sending transceiver 12 transmits a laser test signal, as shown by block 68. Next, it needs to be determined whether the laser test signal is received at the receiving transceiver 12, as shown by block 70. If the laser test signal is received, this condition will then be acknowledged (box 56) by the receiving transceiver 12. The sending transceiver 12 then proceeds to transmit the communications message in laser mode, as shown by block 72. If, however, the laser test signal is not received by the receiving transceiver 12, the sending transceiver transmits a microwave test signal, as shown by box 74. If the microwave test signal is received, this will be acknowledged (box 64) by the receiving transceiver 12. As represented by box 76, the transceiver 12 then transmits the communications message in the microwave mode of operation, as indicated by block 78. Otherwise, the end of the algorithm (block 60) is again reached, and neither the laser mode nor the microwave mode of operation is available for transmission of the communications signal.

For the present invention, the algorithm shown in FIG. 3 can be repeated at regular intervals, preferably multiple times per second. With these regular checks, the operation is able to ensure the system 10 continually checks for the availability of the faster laser mode of operation and, as necessary, the system 10 can shift between its laser mode and its microwave mode of operation.

It is contemplated for the present invention that for full duplex operation, like the laser beam portion which uses the transmitter 14 and the optical receiver 28, the microwave feed 40 will need to both send and receive microwave communications signals. To do this, interference between the send and receive signals can be avoided by using different frequencies with appropriate waveguide complexes. Likewise, for the embodiment incorporating a fiber optic at the focus of the mirror telescope system, both the transmit and receive signal could use the same fiber optic element (eliminating the transmitters 14) for both transmit and receive functions. If different optical wavelengths are used for transmit and receive, appropriate wavelength splitting optics will need to be incorporated as part of the fiber optic transmit/detection system.

While the particular Laser/Microwave Dual Mode Communications System as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A laser/microwave dual mode communications system which comprises:
    a housing formed with an aperture;
    a beam splitter mounted on said housing, said beam splitter being capable of separating a laser beam from a microwave beam;
    a turning mirror mounted on said housing for directing a beam between said aperture and said beam splitter;
    an optical receiver mounted on said housing for receiving a laser beam directed from said beam splitter; and
    a microwave feed mounted on said housing for receiving a microwave beam directed from said beam splitter.

2. A communications system as recited in claim 1 wherein said beam splitter is a dielectric mirror made of a material for reflecting said laser beam and for allowing passage of said microwave beam therethrough.

3. A communications system as recited in claim 2 wherein said turning mirror is spherical and is made of a metalized material.

4. A communications system as recited in claim 1 further comprising a laser transmitter for transmitting said laser beam, said laser transmitter being mounted on said housing.

5. A communications system as recited in claim 1 wherein said microwave feed transmits said microwave beam.

6. A system as recited in claim 5 wherein said microwave feed operates at a frequency, f, substantially in the range between thirty and fifty Gigahertz (30 GHz<f<50 GHz).

7. A system as recited in claim 1 wherein said beam splitter is mounted on said housing between said optical receiver and said microwave feed; and said turning mirror is a spherical mirror mounted on said housing and positioned between said optical receiver and said beam splitter, said spherical mirror being formed with an opening to establish a beam path between said beam splitter and said optical receiver.

8. A communications system as recited in claim 7 further comprising a plurality of optical lenses positioned across said opening of said spherical mirror to focus said laser beam for reception by said optical receiver.

9. A laser/microwave dual mode communications system which comprises:
    an optical receiver;
    a microwave feed;
    a reflecting means for reflecting a communications beam toward a location, said communications beam having a laser component and a microwave component; and
    a differentiator means positioned at said location for directing said reflected microwave component of said communications beam onto said microwave feed and for directing said reflected laser component of said communications beam onto said optical receiver.

10. A communications system as recited in claim 9 wherein said reflecting means is a spherical mirror and is made of a metalized material.

11. A communications system as recited in claim 10 wherein said differentiator means is a dielectric mirror.

12. A communications system as recited in claim 11 wherein said microwave feed transmits said microwave component of said communications beam.

13. A communications system as recited in claim 12 further comprising:
    a housing, said optical receiver, said microwave feed, said spherical mirror and said dielectric mirror being mounted on said housing; and
    a laser transmitter for transmitting said laser component of said communications beam, said laser transmitter being mounted on said housing.

14. A communications system as recited in claim 13 wherein said housing is formed with a single aperture for receiving said communications beam.

15. A communications system as recited in claim 9 wherein said reflecting means is a spherical mirror, said spherical mirror being positioned between said optical receiver and said location and being formed with an opening to establish a beam path for said laser component of said communications beam between said location and said optical receiver, said spherical mirror being oriented to reflect said communications beam onto said differentiator means.

16. A communications system as recited in claim 9 wherein said microwave component of said communication beam has a frequency, f, substantially in the range between thirty and fifty Gigahertz (30 GHz<f<50 GHz).

17. A method for establishing a dual mode laser/microwave communications link which comprises the steps of:

providing a first dual laser/microwave mode transceiver at a first station and a second dual laser/microwave mode transceiver at a second station, said first transceiver and said second transceiver each having a housing formed with an aperture, a laser transmitter, an optical receiver and a microwave feed mounted on said housing, a beam splitter mounted on said housing, and a turning mirror mounted on said housing, said turning mirror being oriented to direct a communications beam between said aperture of said housing and said beam splitter, said beam splitter being positioned to separate said communications beam into a laser component and a microwave component and oriented to direct said microwave component between said beam splitter and said microwave feed and, alternatively, to direct said laser component between said beam splitter and said optical receiver; and selectively transmitting a laser beam and a microwave beam with said first transceiver at said first station for reception by said second transceiver at said second station.

18. A method as recited in claim 17 wherein transmitting step is accomplished with said second transceiver at said second station for reception at said first transceiver at said first station.

19. A method as recited in claim 17 wherein said transmitting of said microwave beam is accomplished at a frequency, f, substantially in the range between thirty and fifty Gigahertz (30 GHz<f<50 GHz).

* * * * *